United States Patent [19]

Barnaby

[11] Patent Number: 4,843,314

[45] Date of Patent: Jun. 27, 1989

[54] TESTING UNIT FOR ROTARY SHAFT ENCODERS

[76] Inventor: Craig Barnaby, 25346 Schoolcraft, Redford, Mich. 48239-2627

[21] Appl. No.: 185,882

[22] Filed: Apr. 25, 1988

[51] Int. Cl.⁴ .................... G01R 31/02; H03K 13/02
[52] U.S. Cl. .................... 324/158 R; 341/120
[58] Field of Search ..... 324/158 R, 158 MG, 158 SY, 324/73 R; 341/118, 119, 120, 121

[56] References Cited

U.S. PATENT DOCUMENTS 3,875,510  4/1975  Beauchane .................... 324/158 SY
4,707,683  11/1987  Yao ...................................... 341/120

Primary Examiner—Ernest F. Karlsen
Attorney, Agent, or Firm—Krass & Young

[57] ABSTRACT

The present invention is a portable testing apparatus for field testing rotary shaft encoders. The rotary shaft encoder is mounted in connection to a motor disposed on a mounting panel whose direction and speed of rotation is controlled by a motor controller. The rotatable shaft of the rotary shaft encoder is coupled to the motor shaft via a shaft couple. A multiple wire connector is employed to connect to the plurality of connection wires of the rotary shaft encoder. Each connection wire of the rotary shaft encoder is connected to one of a plurality of single pole, multiple throw load selection switches. This permits connection of an operator selected one of a predetermined set of voltages and loads to each connection wire of the shaft encoder forming a circuit simulating its use. An output terminal connected to each connection wire of the rotary shaft encoded permits the signal on these corresponding connection wires to be monitored. In the preferred embodiment the testing apparatus is mounted in an attache which may be closed for transport and opened for use.

20 Claims, 3 Drawing Sheets

TESTING UNIT FOR ROTARY SHAFT ENCODERS

TECHNICAL FIELD OF THE INVENTION

The technical field of the present invention is that of testing apparatuses, and more particularly portable testing apparatuses for rotary shaft encoders.

BACKGROUND OF THE INVENTION

Rotary shaft encoders are devices which are employed to indicate the motion of parts of machinery. In particular, rotary shaft encoders are widely employed to measure the motion of the joints in robotic machinery. With the rise in the employment of robotics in manufacturing, such rotary shaft encoders have become very widely employed.

There is a problem related to the extensive use of such rotary shaft encoders when there is some failure in the operation of the robot or other controlled machine which employs such rotary shaft encoders. In many instances the shaft encoder is suspected in the failure. Currently, there is no reliable and proven method for testing such rotary shaft encoders to determine whether the machine failure is due to a failure in the shaft encoder. There are two primary solutions attempted to this problem, each having significant drawbacks.

In a first attempt to solve this problem service involves testing the rotary shaft encoder in place. An oscilloscope probe or the input probe of some other monitoring device is attached to the output lines of the rotary shaft encoder while the rotary shaft encoder is in place within the controlled machine. Then the joint is moved, either by hand or via a controlled movement by the machine itself. This technique is not satisfactory for several reasons. Firstly, it is difficult and sometimes dangerous to attach the oscilloscope probes to the rotary shaft encoder outputs while in place in the machine. In addition, attempting to move the machine to generate the shaft encoder outputs for testing may be difficult or impossible, particularly in light of the fact that the controlled machine is out of order in some manner. Lastly, it is possible that the fault is not in the shaft encoder but rather in the machine itself. For example, if the rotary shaft encoder is not supplied with the proper working voltages or if the outputs are improperly loaded, the output of the rotary shaft encoder will appear incorrect even though the fault is in other parts of the machine and not in the rotary shaft encoder.

The second manner of testing of such rotary shaft encoders in the prior art requires removal of the rotary shaft encoder from the controlled machine. In this case, the rotary shaft encoder is set up on a laboratory bench and supplied with proper working voltages. As in the previous case, the outputs of the rotary shaft encoder are applied to an oscilloscope or other monitoring apparatus to determine whether or not they are proper. In most cases the operator attempts to simulate the operation of the machine by spinning the shaft of the rotary shaft encoder by hand while simultaneously attempting to observe the output on the oscilloscope. Such a test procedure is often a jerry-rigged affair with the supply voltages and the outputs being connected in a rat's nest of wires. This leads to the introduction of external noise or static and to unreliable connection to the rotary shaft encoder. In addition, it is impossible to reliably turn the shaft encoder in a manner enabling the proper observation of its output when using this technique. Lastly, the outputs of the rotary shaft encoder are not loaded in the same manner as they would be loaded when employed in the controlled machine. It is possible for the outputs of the rotary shaft encoder to appear correct when tested in this manner, whereas the rotary shaft encoder will fail when required to drive the load in the controlled machine.

I n view of the foregoing it would be advantageous in the art to provide a manner for reliably and easily testing rotary shaft encoders on the workshop floor.

SUMMARY OF THE INVENTION

The present invention is a testing apparatus for rotary shaft encoders which can be reliably employed on the shop floor. The rotary shaft encoder is removed from the controlled machine which employs this encoder. The rotary shaft encoder is then held in a test fixture in a predetermined location and orientation. The shaft of the rotary shaft encoder is coupled to the shaft of a controlled motor. The holding fixture preferably has some means for adjusting the relationship of the rotary shaft encoder to the motor in order to properly match the length of shafts of these devices. The various inputs and outputs connected to the rotary shaft encoder are coupled to the testing apparatus via the coupling device which was employed for use of the rotary shaft encoder. Such rotary shaft encoders often include a multipin connector for connection of the rotary shaft encoder into the circuit of the controlled machine. The testing apparatus of the present invention employs this same connector for electrical coupling to the rotary shaft encoder.

A panel of switches enables connection of the proper voltage or the proper load to each wire of the rotary shaft encoder via this connector on the shaft encoder. In accordance with the preferred embodiment, the tester includes a number of power supplies producing. voltages such as 5 volts, 12 volts, 15 volts and 24 volts DC. It has been found that these are the most widely employed voltages for driving such rotary shaft encoders. In addition, each such switch has the capability of applying one of a plurality of load resistors to the particular connector. Thus, for example, any output from the rotary shaft encoder can be connected to the desired load. In addition, it is preferable that this load resistor be able to be connected to a pull up voltage corresponding to any one of the supply voltages provided by the tester or to ground. This permits the output of the rotary shaft encoder to be connected to any of the usual type of loads normally employed with these outputs. Each of these switches is also associated with an output jack which enables an oscilloscope probe or other monitoring apparatus to be connected to that particular wire of the rotary shaft encoder.

The tester of the present invention is employed as follows. Firstly, the rotary shaft encoder in question is disconnected and removed from the controlled machine. Next, this rotary shaft encoder is connected in place in the tester. In this regard, the body of the encoder is fixed in place and the shaft of the encoder is connected to the shaft of the driving motor. Then a multiple wire connector is connected to the normal connector of the rotary shaft encoder used to couple it to the apparatus which employs it. This coupling enables each wire of the rotary shaft encoder to be coupled to one of the multiple position switches. Next, the position of the multiple position switches is adjusted in order to apply the proper voltage, or load to each connector. In particular, it is possible that the rotary shaft encoder requires one or more driving voltages for operation on certain of its lines and generates its output on certain other of its lines. As a result of this positioning of the multiple position switches, the rotary shaft encoder is now coupled into a circuit which simulates the circuit employed during its operation. In addition, certain of the wires of the rotary shaft encoder are connected to an oscilloscope or other monitoring apparatus via the output jacks associated with each multiple position switch. The direction and speed of rotation of the shaft of the rotary shaft encoder is controlled via a motor controller connected to the motor which provides rotary torque to the shaft of the rotary shaft encoder. This rotary torque applied by the motor simulates the motion measured by the rotary shaft encoder during operation. As a consequence, the outputs can be monitored via the oscilloscope or other monitoring apparatus to determine whether or not the rotary shaft encoder is operating properly.

In accordance with the present invention, all of these parts including the holding fixture, the multiple power supplies, the motor and motor controller, and the multiple position switches are disposed in a portable suitcase. As such, this shaft encoder testing apparatus is suitable for transportation to the machine which employs the rotary shaft encoder, thereby reducing the amount of time required for servicing the rotary shaft encoders of that machine.

In a further embodiment of the present invention, the suitcase apparatus includes a small oscilloscope which can be selectively connected to each of the multiple position switches. Therefore, the complete apparatus for testing the rotary shaft encoder can be transported in one package.

BRIEF DESCRIPTION OF THE DRAWINGS

These and other objects and aspects of the present invention will become clear from the following description in which.

DETAILED DESCRIPTION OF THE PREFERRED EMBODIMENT

Figure 1:
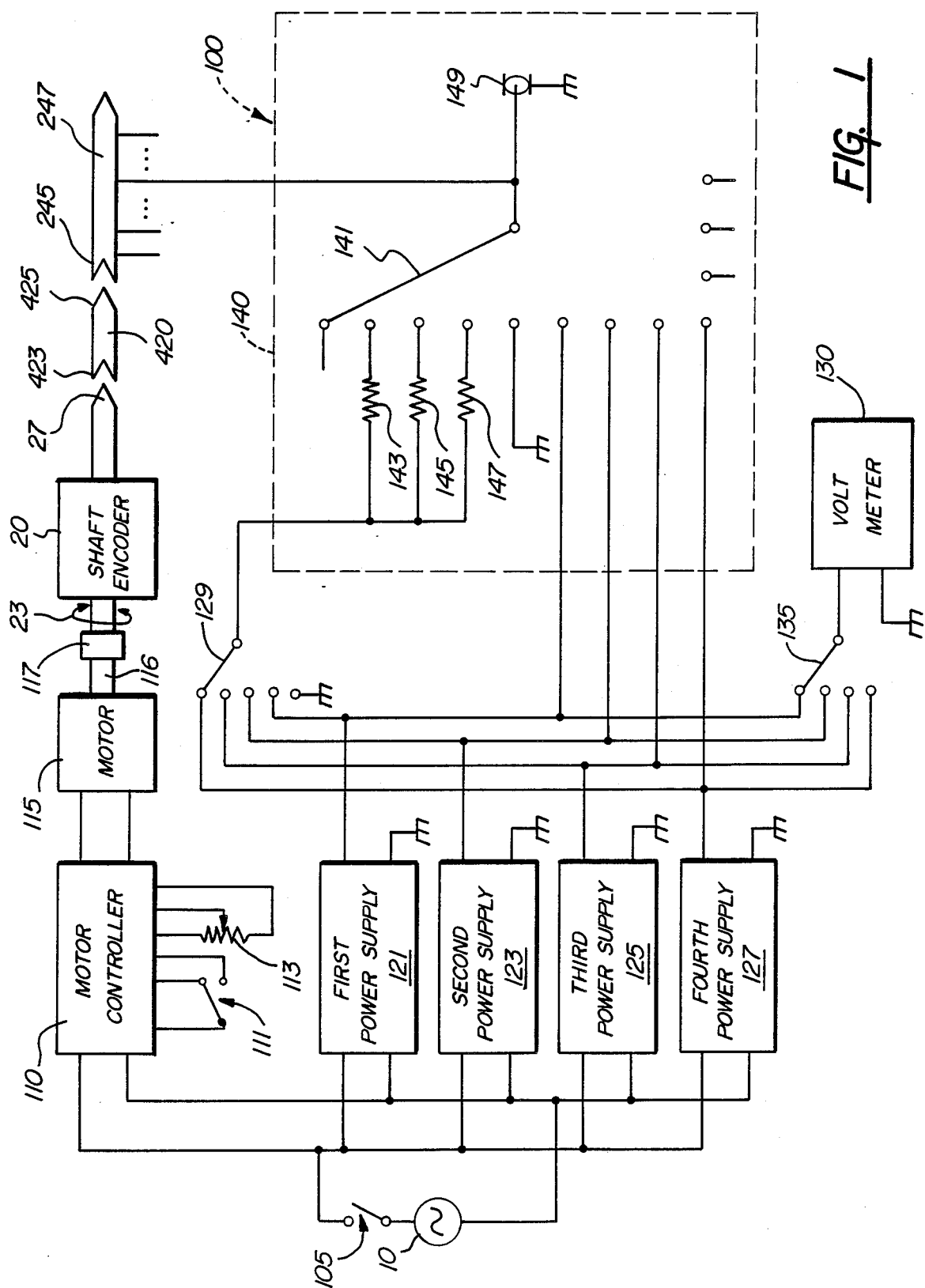
FIG. 1 illustrates a schematic diagram of one embodiment of the shaft encoder testing apparatus in accordance with the present application.

FIG. 1 is a schematic diagram of a first embodiment of the present invention. FIG. 1 illustrates the major electrical parts in this first embodiment of the present invention. The testing apparatus 100 is coupled to an AC power source 10 which supplies the electric power for running each of the parts of testing apparatus 100. This electric power is switched via AC power switch 105. AC power is connected to motor controller 110 and to first power supply 121, second power supply 123, third power supply 125 and fourth power supply 127.

Motor controller 110 is employed to control the rate of shaft rotation of rotary shaft encoder 20. Motor controller 110 is coupled to motor 115 and is controlled by direction switch 111 and speed control potentiometer 113. Motor controller 110 applies the appropriate voltages to motor 115 to control the direction and speed of rotation of shaft 116 of motor 115. Direction control 111 determines whether the shaft 116 of motor 115 rotates clockwise or counter-clockwise. Likewise, speed control potentiometer 113 controls the speed of operation of motor 115.

Shaft 116 of motor 115 is coupled to shaft 23 of rotary shaft encoder 20 via a shaft coupling means 117. This shaft coupling means 117 is further illustrated in FIG. 4. Because of this coupling between shaft 116 of motor 115 and shaft 23 of rotary shaft encoder 20, direction switch 111 and speed control potentiometer 113 control the direction and speed of rotation of shaft 23 of rotary shaft encoder 20. This in turn controls the output produced by rotary shaft encoder 20 on output connector 27.

Testing apparatus 100 includes four direct current power supplies. In accordance with the preferred embodiment of the present invention, these four direct current power supplies supply direct current voltages corresponding to the DC voltages required by most of the rotary shaft encoders which are likely to be tested with the testing apparatus 100. In accordance with the preferred embodiment of the present invention, first power supply 121 generates 5 volts DC; second power supply 123 generates 12 volts DC; third power supply 125 generates 15 volts DC; and fourth power supply 127 generates 24 volts DC. The outputs from each of the power supplies 121 through 127 is coupled to contacts of a number of switches. Switch 129 selects one of the power supply voltages or ground for application to one end of a set of load resistors, in a manner that will be more fully disclosed below. Volt meter selection switch 135 selects one of these voltages to be applied to volt meter 130. Volt meter 130 is employed to monitor the output voltage of a selected one of the power supplies 121 through 127 in accordance with the position of switch 135. This enables the user of testing apparatus 100 to determine whether or not the particular power supply selected is generating the appropriate voltage. Each of power supplies 121, 123, 125, and 127 is connected to a plurality of selection devices 140 in a manner that will be more fully explained below.

The connector 27 of rotary shaft encoder 20 is connected to one end of cable 420 via a connector 423. The other end of cable 420 is connected via a connector 425 to a connector 245 mounted on the testing apparatus 100. Each of the lines in cable 247 is connected to a selection device 140. FIG. 1 illustrates only one of these selection devices 140, because they are identical except that they are connected to differing conductors of cable 247.

Selection device 140 is employed to couple the appropriate voltage or load to the particular line of shaft encoder 20, and to enable connection to an external monitoring apparatus. Selection device 140 includes a single pole multiple position switch 141 which is shown as connectable to one of twelve differing switch positions. In accordance with the preferred embodiment of the present invention, switch 141 can switch between twelve positions as follows: (1) no load; (2) a first pull up resistor 143; (3) a second pull up resistor 145; (4) a third pull up resistor 147; (5) ground; (6) first power supply 121; (7) second power supply 123; (8) third power supply 125; and (9) fourth power supply 127. In the illustrated embodiment positions 10, 11 and 12 of switch 141 are not connected, however, those skilled in the art would appreciate that these positions can be employed for other voltages or. loads. In accordance with the preferred embodiment of the present invention, load resistor 143 is 470 ohms, load resistor 145 is 1 K ohms and load resistor 147 is 10 K ohms. Thus, the connections of multiple position switch 141 are as shown in Table 1. With the exception of the not connected positions 10 to 12, this order of circuits connected to the switch positions is a safety feature of the present invention. The order is from connections which are least dangerous to the rotary shaft encoder (position 1, no load), through connections which have a greater potential for damage to the rotary shaft encoder (positions 2 to 4, the various load resistors; position 5, ground) to connections that have the highest potential for damage to the rotary shaft encoder (positions 6 to 9, increasing level voltage sources). It is contemplated that the switches 141 will be reset to position 1 after each test, and rotated from position 1 to the position required for the particular rotary shaft encoder being tested. In this manner, inadvertent untimely actuation of AC line switch 105 has the least potential for damaging the rotary shaft encoder.

TABLE 1

| Switch Position | Connection |
| --- | --- |
| 1 | no load |
| 2 | 470 ohm load resistor |
| 3 | 1K ohm load resistor |
| 4 | 10K ohm load resistor |
| 5 | ground |
| 6 | +5 volt DC |
| 7 | +12 volt DC |
| 8 | +15 volt DC |
| 9 | +24 volt DC |
| 10 | no connection |
| 11 | no connection |
| 12 | no connection |

The testing apparatus 100 of the present invention is employed as follows. Firstly, the rotary shaft encoder is removed and disconnected from the equipment which employs this shaft encoder. The rotary shaft encoder 20 is then inserted in a test fixture included within testing apparatus 100 and secured. The shaft 23 of the shaft encoder 20 is secured to motor shaft 116 via coupling apparatus 117. This ensures that torque developed by motor 115 is employed in rotating the shaft 23 of shaft encoder 20.

Once this shaft encoder is mechanically secured in this testing fixture then the electrical connection is made to the shaft encoder via connector 27. In accordance with the preferred embodiment of the present invention, the testing apparatus 100 includes a plurality of cables 420. Each cable has a connector 423 adapted for connection to the connector 27 of a particular type of rotary shaft encoder. In addition, each cable 420 includes a similar connector 425 adapted to connect to the single connector 245 employed in a testing apparatus 100. By this expedient, the testing apparatus 100 is made capable of connection to a plurality of differing types of rotary shaft encoders by merely selecting the appropriate cable 420 having the proper connector 423 for connection to the connector 27 of that type of shaft encoder. It should be noted that the connectors 27 of shaft encoder 20 may have fewer connections than the total number of selection devices 140 employed in testing apparatus 100. It is essential that testing apparatus 100 include a sufficient number of selection devices 140 in order to provide the proper signal or load to each wire of the type of rotary shaft encoder having the most wires. In accordance with the preferred embodiment, ten selection devices 140 are provided in the testing apparatus 100.

After connection of cable 420, selection devices 140 are set. For each selection device 140 which is connected to a wire of the rotary shaft encoder, multiple position switch 141 must be switched to the proper position. The user would typically consult a table which indicates the connections required for each wire of the particular type of rotary shaft encoder currently being tested. This table would also typically indicate the particular selection device 140 to which that signal line is connected. By consulting this table, the user of testing apparatus 100 is able to select the position of multiple position switch 141 in order to apply the appropriate signal or load to the corresponding wire of rotary shaft encoder 20. In particular, it is contemplated that one or more direct current supply voltages must be connected to the rotary shaft encoder 20. It is also contemplated that the output lines of the rotary shaft encoder 20 will be connected to one of the plurality of load resistors connected to the corresponding multiple position switch 141. The particular load resistor employed is selected with reference to the particular load which the rotary shaft encoder must drive when connected in the controlled machine. After all of the selection devices 140 have been set, the rotary shaft encoder 20 is connected in a circuit which simulates the circuit in the machine where it is used. This permits the rotary shaft encoder 20 to be tested under the same conditions as it is used.

Next an oscilloscope or other monitoring apparatus is connected to the appropriate jacks 149 on selection devices 140. It will typically be the desire of the person performing the test to monitor the output signals of the rotary shaft encoder. This can be performed by connecting the input probes of the oscilloscope or other monitoring apparatus to the jacks 149 corresponding to the selection device 140 connected to the appropriate line from rotary shaft encoder 20. This selection is made based upon the table of correspondence between the particular lines of rotary shaft encoder 20, their function and the particular selection device 140.

Once these connections are made the apparatus is ready to begin testing the rotary shaft encoder. It is contemplated that the AC line switch 105 will not be turned on until these connections are made. This is in order to prevent the application of inappropriate voltages to the lines of rotary shaft encoder 20. For example, if the 24-volt DC from fourth power supply 127 is coupled to a low voltage output line, then it is very possible that the rotary shaft encoder will be damaged by the tester. This possibility can be eliminated by insuring that AC line switch 105 remains off until all of the selection devices 140 are properly set.

The shaft encoder is next rotated in a desired direction and speed by proper adjustment of direction switch 111 and speed control potentiometer 113 connected to motor controller 110. Under the appropriate manual inputs, motor controller 110 controls motor 115 to turn shafts 23 of the rotary shaft encoder 20. Testing the rotary shaft encoder 23 will typically involve controlling it in both clockwise and counterclockwise direction and at varying speeds. The operator can then monitor the outputs of the rotary shaft encoder via the appropriate jack 149 to determine whether or not the rotary shaft encoder 20 is generating the proper signals. Once the test has been completed then rotary shaft encoder 20 is removed from the testing fixture by reversing the steps previously described.

Figure 2:
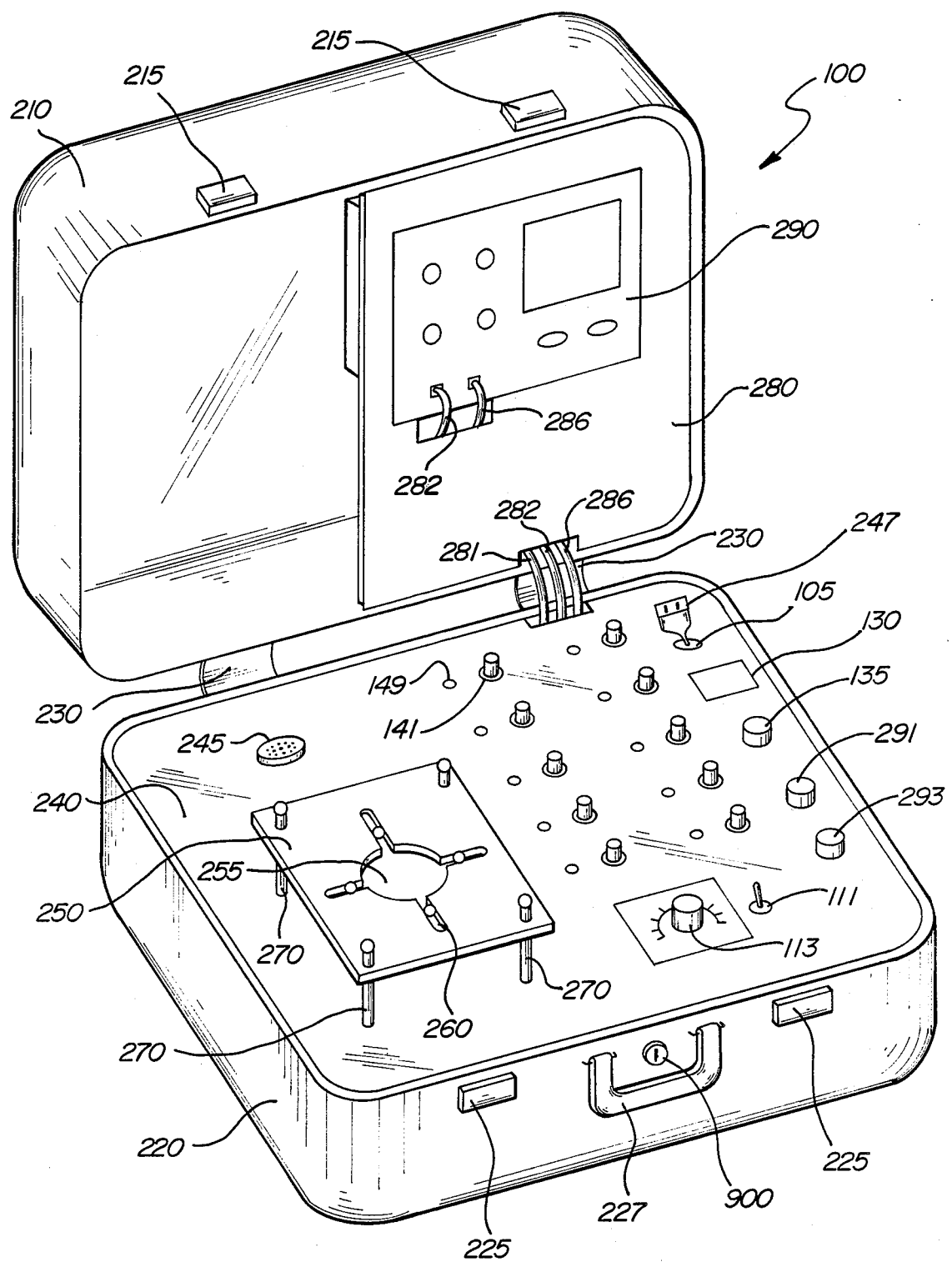
FIG. 2 illustrates a perspective view of one embodiment of the present invention in which the rotary shaft encoder testing apparatus is constructed within a suitcase.

FIG. 2 illustrates a perspective view of the testing apparatus 100 embodied in a suitcase in accordance with a preferred embodiment of the present invention. The apparatus illustrated in FIG. 2 differs from the schematic diagram of FIG. 1 in that FIG. 2 illustrates an oscilloscope 290 not shown in FIG. 1.

In accordance with the preferred embodiment of the present invention the testing apparatus 100 is formed in a suitcase composed of upper shell 210 and lower shell 220. Upper shell 220 includes latches 215 which mate with latches 225 in lower shell 220, enabling the suitcase to be secured when shut. Upper shell 210 and lower shell 220 are connected via hinges 230 which permit the top to be opened for use. Lower shell 220 also includes handle 227 which permits transportation of the testing apparatus 100 to the location where it is employed. The suitcase includes a lock 900 so that the testing apparatus 100 may be secured from unauthorized access and use.

Mounted within lower shell 220 and approximately flush with the top of lower shell 220 is a mounting plate 240 upon which many of the components of the testing apparatus 100 are mounted. As illustrated in FIG. 2 these include AC line switch 105, direction control switch 111, speed control potentiometer 113, voltmeter 130, voltmeter source selection switch 135, the plurality of multiposition selection switches 141 with their corresponding jacks 149, and connector 245 which connects to the various selection devices 140. FIG. 2 also illustrates further electrical controls which were not illustrated in the schematic diagram of FIG. 1. In accordance with the alternative embodiment illustrated in FIG. 2, oscilloscope selection switches 291 and 293 are provided on mounting plate 240. Their use and electrical connection will be further described below in conjunction with FIG. 3.

FIG. 2 further illustrates the test fixture used to secure the rotary shaft encoder in proper alignment with the shaft 116 of motor 115. This fixture includes a plate 250 having central aperture 255. Connecting to central aperture 255 are a set of spaced channels each of which includes a mounting clip 260. In a manner that will be more fully described below, mounting clips 260 are employed to secure rotary shaft encoder 20 to the fixture for testing. Plate 250 is connected to mounting plate 240 via a plurality of screw shafts 270. Screw shafts 270 can be rotated to move the plate 250 up or down. This provides adjustment of the height of rotary shaft encoder 20 relative to the shaft coupling device 117 of motor 115. This provides proper mating of the torque developed by motor 115 to the shaft 23 of rotary shaft encoder 20.

The apparatus illustrated in FIG. 2 differs from the schematic diagram of FIG. 1 in that this apparatus includes an oscilloscope 290. Oscilloscope 290 is mounted on plate 280 which is disposed in upper shell 210 and substantially parallel to the top of upper shell 210. Note that plate 280 does not cover the entire upper shell 210. On the contrary, plate 280 leaves a space where the plate 250 and the accompanying screw posts 270 may be lodged when the suitcase is closed. Oscilloscope 290 is connected to the main unit mounted on mounting panel 240 via three lines 281, 283 and 286 disposed between the lower shell 220 and the upper shell 210. Line 281 is employed to supply AC electric power to oscilloscope 290. Lines 282 and 286 are connected to supply the input signals to respective inputs of oscilloscope 290. In accordance with the embodiment illustrated in FIG. 2, oscilloscope 290 is of the dual trace type.

Figure 3:
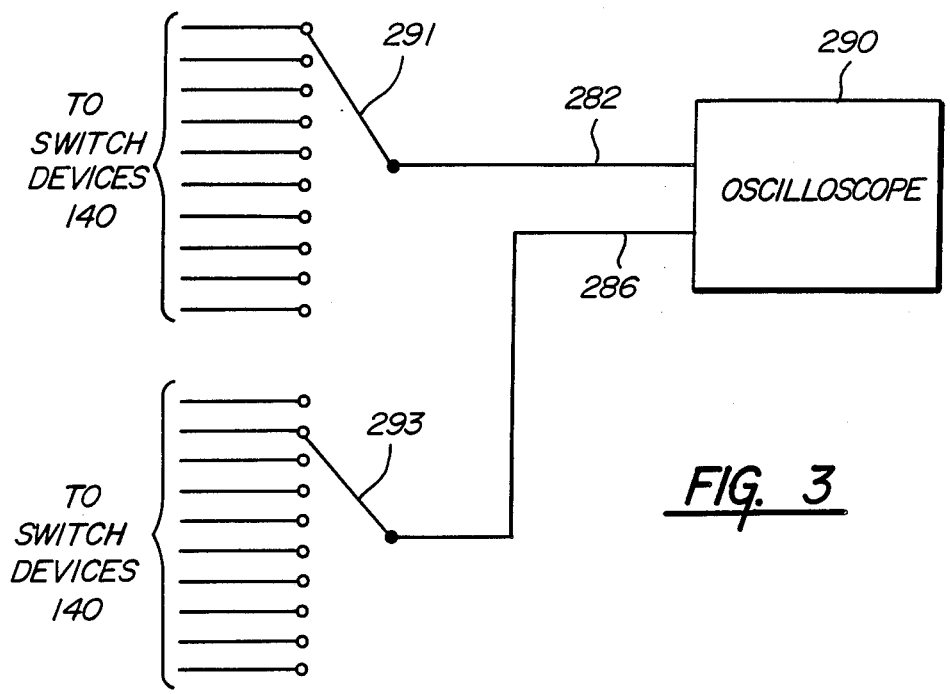
FIG. 3 illustrates a schematic diagram showing the manner in which the signals from the various multiple position switches are applied to the oscilloscope.

FIG. 3 is a schematic diagram illustrating the operation of oscilloscope selection switches 291 and 293. The oscilloscope selection switches 291 and 293 are essentially identical switches which are of the multiple position single pole type. Each is connected to the plurality of selection devices 140 in the same manner as the connection of jack 149. Oscilloscope selection switch 291 is connected to line 282 and hence to a first input of oscilloscope 290. Likewise, oscilloscope selection switch 293 is connected to line 286 forming a second input to oscilloscope 290. During use, oscilloscope selection switches 291 and 293 are switched to the appropriate selection devices 140 corresponding to the connections from rotary shaft encoder 20 to be monitored. Accordingly, oscilloscope 290 provides an indication of the particular signal appearing on the selected line.

Figure 4:
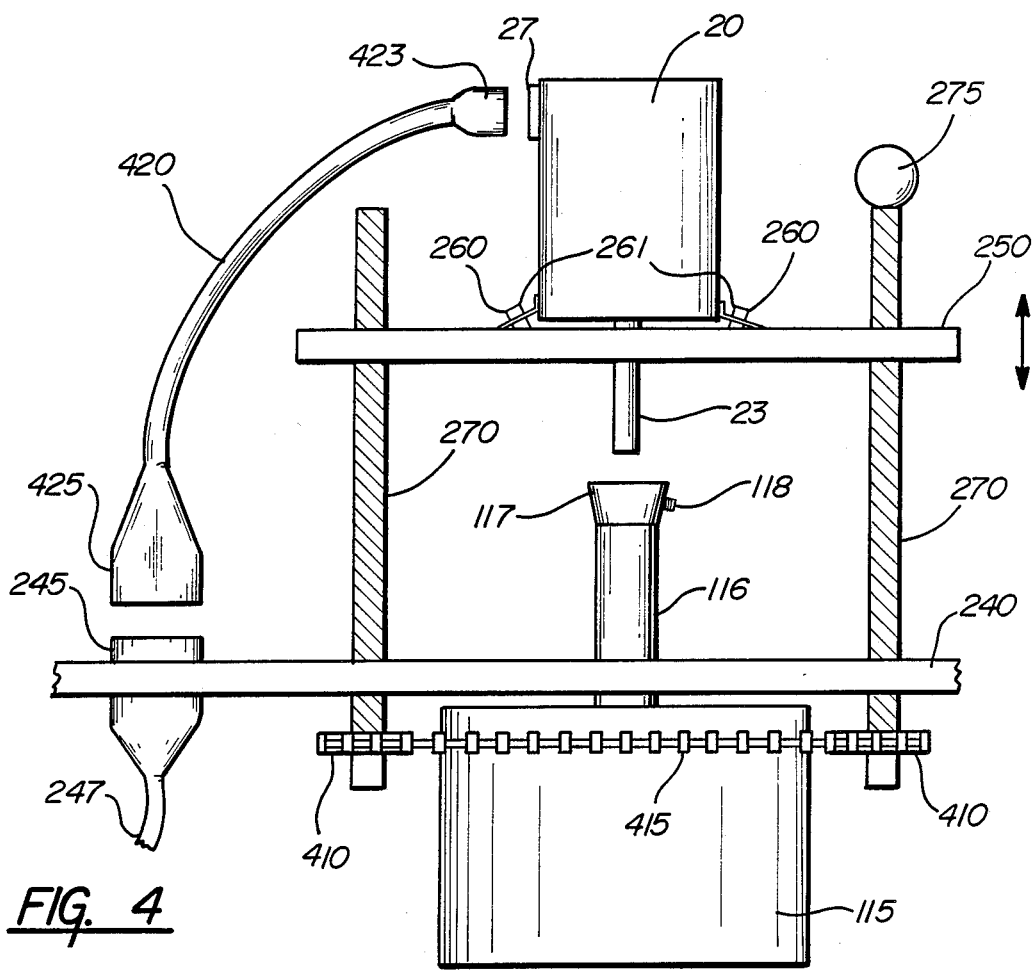
FIG. 4 illustrates a cut-away view of the encoder holding fixture, the motor and the connection to the rotary shaft encoder.

FIG. 4 is a cutaway view of the details of the test mounting fixture in accordance with the preferred embodiment of the present invention. As illustrated in FIG. 4, cable 420 connects at one end via connector 423 to connector 27 of the shaft encoder 20 and at the other end via connector 425 to connector 245 mounted on mounting plate 240. This provides the electrical connection between rotary shaft encoder 20 and the selection devices 140. Rotary shaft encoder 20 is secured to test fixture plate 250 via mounting clips 260. The shaft 23 of rotary shaft encoder 20 is extended through central aperture 255 in test fixture plate 250. The mounting clips 260 are then pushed up against the body of the rotary shaft encoder 220 and secured there. This is provided by tightening of screws 261 which form a part of mounting clips 260. rotary shaft encoder 20 is then secured to plate 250.

The height of plate 250 is then adjusted by rotation of the four screw posts 270. This rotation is facilitated by handle 275 on one of the screw posts 270. The screw posts 270 are ganged together underneath mounting plate 240. Each of these screw posts 270 includes a gear 410 which is connected through a common chain 415 to all of the screw posts. Rotation of one of the screw posts then causes rotation of all. This rotation causes plate 250 to be moved up or down depending upon the direction of rotation. Plate 250 is initially moved up to position where shaft 23 is beyond the shaft coupling device 117. Once the rotary shaft encoder 20 is secured to plate 250 then plate 250 is lowered until shaft 23 mates with shaft coupling device 117. FIG. 4 illustrates set screw 118 which is used to secure shaft 23 within shaft fixture 117. Once the shaft 23 has properly mated with shaft coupling fixture 117 then set screw 118 is secured in order to transmit the torque from shaft 116 of motor 115 to the shaft 23 of rotary shaft encoder 20.

I claim:

1. A testing apparatus for testing rotary shaft encoders having a rotatable shaft mounted within an encoder body and a plurality of connection wires comprising:

a mounting means adapted to hold the encoder body of a rotary shaft encoder in a predetermined location and orientation;

a shaft rotation means for generating rotary torque in an operator selected direction at an operator selected speed;

a shaft coupling means adapted to couple the rotatable shaft of a rotary shaft encoder whose encoder body is held in said predetermined location and orientation by said mounting means and connected to said shaft rotation means for transmitting said rotary torque to the rotatable shaft of the rotary shaft encoder;

a multiple wire connector adapted for connection to the plurality of connection wires of the rotary shaft encoder;

a plurality of operator selectable load switch means, each connected to a corresponding wire of said multiple wire connector, for operator selected connection one of a predetermined set of voltages and loads to said corresponding wire of said multiple wire connector; and a plurality of output terminals, each connected to a corresponding wire of said multiple wire connector, for permitting connection to the corresponding wire of said multiple wire connector, thereby permitting the signal on the corresponding connection wire of the rotary shaft encoder to be monitored.

2. The testing apparatus of claim 1, further comprising:

a plurality of direct current power supplies, each direct current power supply generating a corresponding predetermined direct current voltage; and each of said plurality of operator selectable load switch means is connected to each of said plurality of direct current power supplies for permitting operator selected connection of one of said predetermined direct current voltages to said corresponding connection wire of a rotary shaft encoder.

3. The testing apparatus of claim 2, wherein:

each of said plurality of operator selectable load switch means includes a plurality of load resistors, each load resistor having first and second terminals and a corresponding unique electrical resistance therebetween, each of said operator selectable load switch means for selected connection of said corresponding connection wire of the rotary shaft encoder to said first terminal of one of said plurality of load resistors; and further comprising a load line selector switch connected to ground, to each of said plurality of direct current power supplies and to said second terminals of each of said load resistors for connecting a selected one of said predetermined direct current voltages or ground to said second terminals of all of said load resistors.

4. The testing apparatus of claim 3, wherein:

each of said plurality of operator selectable load switch means permits the selection of no electrical connection to said corresponding connection wire of a rotary shaft encoder.

5. The testing apparatus of claim 3, wherein:

each of said plurality of operator selectable load switch means permits the selection of ground connection to said corresponding connection wire of a rotary shaft encoder.

6. The testing apparatus of claim 3, wherein:

each of said plurality of operator selectable load switch means includes a single pole, multiple throw rotary switch having connections disposed in order from a reference location for no electrical connection, followed by said load resistors in order from said load resistor having the least electrical resistance to said load resistor having the greatest electrical resistance, ground connection, followed by said direct current power supplies from said direct current power supply having the least predetermined direct current voltage to said direct current power supply having the greatest predetermined direct current voltage.

7. The testing apparatus of claim 2, further comprising:

a voltage meter having a pair of input terminals for generating an operator perceivable indication of the voltage across said pair of input terminals; and a voltage meter switch connected to said plurality of direct current power supplies and said voltage meter for selectively coupling said predetermined direct current voltage of one of said plurality of direct current power supplies across said input terminals, whereby the voltage of said selected direct current power supply can be monitored.

8. The testing apparatus of claim 1, wherein:

said multiple wire connector is selected from among a set of a plurality of multiple wire connectors, each multiple wire connector of said set adapted for connection to the connection wires of a unique type of rotary shaft encoder.

9. The testing apparatus of claim 1, wherein:

said mounting means includes a height adjustment for said predetermined location whereby rotary shaft encoders of differing height can be accommodated.

10. A portable testing apparatus for field testing rotary shaft encoders having an encoder rotatable shaft mounted within an encoder body and a plurality of connection wires comprising:

an attache having generally rectangular upper and lower shells hinged along one side thereof and adapted for selective closure along a side opposite to said one side, whereby said attache may be closed for transportation and opened for use;

a lower mounting panel disposed in said lower shell of said attache, said lower mounting panel forming an interior space with said lower shell;

a motor disposed on said lower mounting panel enclosed within said interior space having a motor rotatable shaft extending through an opening in said lower mounting panel;

a mounting means disposed on said lower mounting panel proximate to said motor adapted to hold the encoder body of a rotary shaft encoder with the encoder rotatable shaft in a predetermined location and orientation with regard to said motor rotatable shaft;

a motor control means disposed on said lower mounting panel having an operator speed control member extending through an opening in said lower mounting panel and an operator direction control member extending through an opening in said lower mounting panel, electrically connected to said motor for controlling said motor to rotate in a direction selected by said operator direction control member at a speed selected by said operator speed control member;

a shaft coupling means disposed on said motor rotatable shaft adapted to couple to the encoder rotatable shaft when the rotary shaft encoder is in said predetermined location and orientation, whereby rotation of said motor rotatable shaft is coupled to the encoder rotatable shaft;

a multiple wire connector adapted for connection to the plurality of connection wires of a rotary shaft encoder;

a plurality of single pole, multiple throw load selection switches, each load selection switch disposed o said lower mounting panel enclosed within said interior space having an operator control knob extending through an opening in said lower mounting panel and connected to a corresponding wire of said multiple wire connector for connection of an operator selected one of a predetermined set of voltages and loads to said corresponding wire of said multiple wire connector; and a plurality of output terminal disposed on said lower mounting panel and accessible from the exterior of said enclosed space, each output terminal connected to a corresponding wire of said multiple connector, for permitting connection to said correspond wire of said multiple wire connector thereby permitting the signal on the corresponding connection wire of the rotary shaft encoder to be monitored.

11. The testing apparatus of claim 10, further comprising:

a plurality of direct current power supplies, each direct current power supply disposed on said lower mounting panel and generating a corresponding predetermined direct current voltage; and each of said plurality of load selection switches is connected to each of said plurality of direct current power supplies for permitting operator selected connection of one of said predetermined direct current voltages to said corresponding connection wire of a rotary shaft encoder.

12. The testing apparatus of claim 11, wherein:

each of said plurality of operator selectable load switches includes a plurality of load resistors, each load resistor having first and second terminals and a corresponding unique electrical resistance therebetween, each of said operator selectable load switches for selected connection of said corresponding connection wire Of the rotary shaft encoder to said first terminal of one of said plurality of load resistors; and further comprising a load line selector switch disposed on said lower mounting panel and connected to ground, to each of said plurality of direct current power supplies and to said second terminals of each of said load resistors for connecting a selected one of said predetermined direct current voltages or ground to said second terminals of all of said load resistors.

13. The testing apparatus of claim 12, wherein:
each of said plurality of load selection switches permits the selection of no electrical connection to said corresponding connection wire of a rotary shaft encoder.

14. The testing apparatus of claim 12, wherein:

each of said plurality of load selection switches permits the selection of ground connection to said corresponding connection wire of a rotary shaft encoder.

15. The testing apparatus of claim 12, wherein:

each of said plurality of load selection switches includes connections disposed in order from a reference location for no electrical connection, followed by said load resistors in order from said load resistor having the least electrical resistance to said load resistor having the greatest electrical resistance, ground connection, followed by said direct current power supplies from said direct current power supply having the least predetermined direct current voltage to said direct current power supply having the greatest predetermined direct current voltage.

16. The testing apparatus of claim 11, further comprising:

a voltage meter disposed on said lower mounting panel and having a pair of input terminals for generating an operator perceivable indication of the voltage across said pair of input terminals; and a voltage meter switch disposed on said lower mounting panel and connected to said plurality of direct current power supplies and said voltage meter for selectively coupling said predetermined direct current voltage of one of said plurality of direct current power supplies across said input terminals, whereby the voltage of said selected direct current power supply can be monitored.

17. The testing apparatus of claim 10, wherein:

said multiple wire connector is selected from among a set of a plurality of multiple wire connectors, each multiple wire connector of said set adapted for connection to the connection wires of a unique type of rotary shaft encoder.

18. The testing apparatus of claim 10, wherein:

said mounting means includes a height adjustment for said predetermined location whereby rotary shaft encoders of differing height can be accommodated.

19. The testing apparatus of claim 10, further comprising:

at least one monitor selection switch disposed on said lower mounting panel nd connected to each of said load selection switches for selecting one of the corresponding connection wires of the rotary shaft encoder;

an upper mounting panel disposed in said upper shell of said attache, said upper mounting panel forming an upper interior space with said upper shell;

a monitoring apparatus disposed on said upper mounting panel connected to each of said at least one monitor selection switches for generating operator perceivable indications of the signal on the connection wire selected by each of said at least one monitor selection switches.

20. The testing apparatus of claim 19, wherein:
said monitoring apparatus is an oscilloscope.

* * * * *